US011111969B2

(12) United States Patent
Arnault et al.

(10) Patent No.: US 11,111,969 B2
(45) Date of Patent: Sep. 7, 2021

(54) SEALED CLUTCH THRUST BEARING DEVICE AND DRIVELINE SYSTEM INCLUDING SUCH A DEVICE

(71) Applicant: Aktiebolaget SKF, Gothenburg (SE)

(72) Inventors: Benoit Arnault, Saint-Cyr-sur-Loire (FR); Benoît Hauvespre, Saint Etienne de Chigny (FR); Thomas Perrotin, Saint Roch (FR); Nicolas Tronquoy, Fondettes (FR); Samuel Viault, Saint-Antoine-du-Rocher (FR)

(73) Assignee: Aktiebolaget SKF, Gothenburg (SE)

( * ) Notice: Subject to any disclaimer, the term of this patent is extended or adjusted under 35 U.S.C. 154(b) by 0 days.

(21) Appl. No.: 16/833,993

(22) Filed: Mar. 30, 2020

(65) Prior Publication Data

US 2020/0370606 A1 Nov. 26, 2020

(30) Foreign Application Priority Data

May 24, 2019 (DE) .......................... 102019207679.3

(51) Int. Cl.
| | | |
|---|---|---|
| *F16C 19/16* | (2006.01) | |
| *F16C 33/78* | (2006.01) | |
| *F16D 23/14* | (2006.01) | |
| *B60K 23/08* | (2006.01) | |
| *F16C 33/80* | (2006.01) | |
| *B60K 17/02* | (2006.01) | |

(52) U.S. Cl.
CPC ............ *F16D 23/147* (2013.01); *B60K 23/08* (2013.01); *F16C 19/16* (2013.01); *F16C 33/805* (2013.01); *B60K 17/02* (2013.01); *F16C 2361/43* (2013.01)

(58) Field of Classification Search
CPC .... F16C 19/16; F16C 19/163; F16C 33/7823; F16C 33/7826; F16C 33/783; F16C 33/80; F16C 33/805; F16C 2361/43; F16C 23/147; B60K 17/02; B60K 23/08; F16D 23/147
See application file for complete search history.

(56) References Cited

U.S. PATENT DOCUMENTS

| | | | | |
|---|---|---|---|---|
| 4,013,327 A | * | 3/1977 | Kunkel ................. | F16D 23/142 384/615 |
| 4,365,850 A | * | 12/1982 | Perrichot .............. | F16D 23/142 384/611 |
| 4,815,867 A | * | 3/1989 | Ladin .................... | F16C 19/163 192/110 B |
| 6,854,578 B2 | * | 2/2005 | Dittmer .................. | F16C 33/78 192/98 |
| 10,619,680 B2 | | 4/2020 | Arnault | |
| 2002/0134640 A1 | * | 9/2002 | Klopfer .................. | F16C 41/04 192/98 |

(Continued)

FOREIGN PATENT DOCUMENTS

| | | | |
|---|---|---|---|
| DE | 102009030209 A1 * | 12/2010 | ............. F16C 33/78 |
| DE | 102018200783 A1 | 7/2019 | |

*Primary Examiner* — Phillip A Johnson
(74) *Attorney, Agent, or Firm* — Garcia-Zamor Intellectual Property Law; Ruy Garcia-Zamor; Bryan Peckjian

(57) ABSTRACT

A clutch thrust bearing device including a rolling bearing, an axially movable piston having a radial plate, and a resilient biasing member. At least one between the inner and the outer peripheries of the radial plate of the axially movable piston is provided with a bearing sealing element of resilient material having at least one sealing lip in sliding contact with the rotatable ring of rolling bearing.

10 Claims, 5 Drawing Sheets

(56) References Cited

U.S. PATENT DOCUMENTS

2003/0010595 A1* 1/2003 Heller .................. F16D 25/083
  192/85.51
2015/0308509 A1* 10/2015 Arnault .................. F16D 23/14
  384/484

* cited by examiner

A-A

SEALED CLUTCH THRUST BEARING DEVICE AND DRIVELINE SYSTEM INCLUDING SUCH A DEVICE

CROSS-REFERENCE TO RELATED APPLICATIONS

This application claims priority to French Patent Application no. 102019207679.3, filed May 24, 2019, the contents of which is fully incorporated herein by reference.

TECHNICAL FIELD OF THE INVENTION

The present invention relates to a clutch thrust bearing device including a bearing. The invention also relates to a driveline system including such a device, the system being provided to an all-wheel drive driveline system of a motor vehicle.

BACKGROUND OF THE INVENTION

An all-wheel drive driveline system for a motor vehicle generally comprises a primary front drive axle coupled to a secondary or rear drive axle.

When only two wheels of a four-wheels vehicle operate as driving wheel, the rear drive system including the rear drive axle and rear wheels may be disconnected from the front drive system including the front drive axle and front wheels. Furthermore, it could be desirable to disconnect only one of or both rear wheels depending on the operation mode of the motor vehicle.

For this purpose, it is known to provide a rear drive module to the rear drive system, the rear drive module including clutch thrust devices to distribute torque between the front and rear axle, and between the two wheels. Clutch thrust devices are also able to disconnect the rear drive system, the wheel being uncoupled to driveline. It is also known rear drive modules including two clutches, each of the clutches being able to disconnect one rear wheel from the driveline.

Such rear drive modules enable a motor vehicle with off-road capabilities, and on-road high performances, in particular with efficient stability, efficient dynamic operation, and also low fuel consumption.

Advantageously, the clutch thrust devices are of the well-known multi-plate types and include an axially movable piston disposed within a cavity between a clutch bearing and a housing, the piston cavity being connected to a source of hydraulic fluid which may variably provide pressurized fluid in the cavity to axially move the piston. Clutch thrust devices further include a resilient biasing member exerting an axial preload onto the clutch bearing. The clutch bearing is able to axially move by the piston movement and then actuates a coupling member engaging the plates. It is known to use a clutch bearing with a plurality of rolling elements, for example needles or balls, arranged in a raceway chamber defined between two rings in relative rotation.

Rolling elements and rings are affected by pollution that increase the friction torque within in the clutch bearing to further increase the vehicle fuel consumption, that deteriorate these parts and reduce the clutch bearing service life. It is then desirable to further improve the performances of such rear drive module, in particular by protecting the raceway chamber from particles and dust.

SUMMARY OF THE INVENTION

The aim of the invention is to overcome these drawbacks by proposing a sealed clutch thrust bearing, in particular for use in a rear drive module of a driveline system of a motor vehicle, able to transmit an axial force from an axially movable piston to a resilient biasing member, of reduced friction torque, of increased service life, and of easy and low-cost manufacturing process.

To this end, the invention relates to a clutch thrust bearing device comprising a rolling bearing, an axially movable piston, and a resilient biasing member.

The rolling bearing has a fixed ring, a rotatable ring, and a plurality of rolling elements located in a raceway chamber defined between the rings. The fixed ring is provided with an axial contact surface able to bear against the axially movable piston. The rotatable ring is provided with an axial contact surface able to bear against a resilient biasing member.

The axially movable piston is disposed between a housing and the rolling bearing. The axially movable comprised a radial plate with an inner periphery and an outer periphery. The piston comprises housing sealing means made of resilient material to define a sealed piston cavity with the housing. The piston cavity is connected to a source of hydraulic fluid which may variably provide pressurized fluid in the cavity to axially move the piston.

The resilient biasing member exerts an axial preload onto the rolling bearing, the rolling bearing being able to axially move by the piston movement and then compressing the resilient biasing member that actuates a coupling member engaging plates.

According to the invention, at least one between the inner and the outer peripheries of radial plate of axially movable piston is provided with a bearing sealing element of resilient material having at least one sealing lip in sliding contact with the rotatable ring of rolling bearing.

According to further aspects of the invention which are advantageous but not compulsory, such a ball bearing may incorporate one or several of the following features:

The rolling bearing is a ball bearing, the rolling elements being balls located in a raceway chamber defined between the rings.

The fixed ring is an inner ring, and the rotatable ring is an outer ring.

The fixed ring is an outer ring, and the rotatable ring is an inner ring.

The ball bearing further comprises an annular cage comprising a plurality of pockets that receive each a ball.

The inner ring and the outer ring are made of tempered steel.

The radial plate is made of steel.

The housing sealing elements comprise an inner lip and an outer lip in sliding contact with walls of piston cavity.

The housing sealing means are made of polymer or synthetic material.

The housing element means are overmoulded onto the radial plate.

The bearing sealing element is made of polymer or synthetic material.

The bearing sealing element is overmoulded onto the periphery of radial plate.

The housing sealing means and the bearing sealing element are formed integral.

The bearing sealing element is provided to the inner periphery of radial plate, the sealing element being in sliding contact with an inner portion of rotatable ring.

The bearing sealing element is provided to the outer periphery of radial plate, the sealing element being in sliding contact with an outer portion of rotatable ring.

The bearing sealing element comprises at least one additional lip.

At least one additional lip is in sliding contact with the rotatable ring.

At least one additional lip covers the sliding lip and defines a gap with the rotatable ring to form a labyrinth seal lip.

The gap between the rotatable ring and at least one additional sealing lip extends radially.

The gap between the rotatable ring and at least one additional sealing lip extends axially.

The axially movable piston comprises at least one axial portion that axially extends from the inner and/or outer periphery of radial plate towards the rotatable ring.

The housing sealing means are attached to axial portions of axially movable piston.

The bearing sealing element is attached to an axial portion of axially movable piston.

At least one axial portion that extends from radial plate covers the sliding lip and defines a gap with the rotatable ring to form a labyrinth seal.

The resilient biasing member is a wavy spring.

The invention also relates to a driveline system of a motor vehicle comprising such a clutch thrust bearing device according to the invention for selectively connecting or disconnecting at least one wheel from the driveline system.

Advantageously, the driveline system comprises a front drive system including a front drive axle and front wheels, and a rear drive system including a rear drive axle, a rear drive module and rear wheels, the rear drive module being provided with clutch thrust bearing devices according to the invention in series, each being able to selectively connect or disconnect one of the rear wheels.

BRIEF DESCRIPTION OF THE DRAWINGS

The invention will now be explained in correspondence with the annexed figures, as an illustrative example, without restricting the object of the invention. In the annexed figures.

DETAILED DESCRIPTION OF SOME EMBODIMENTS

Figure 1:
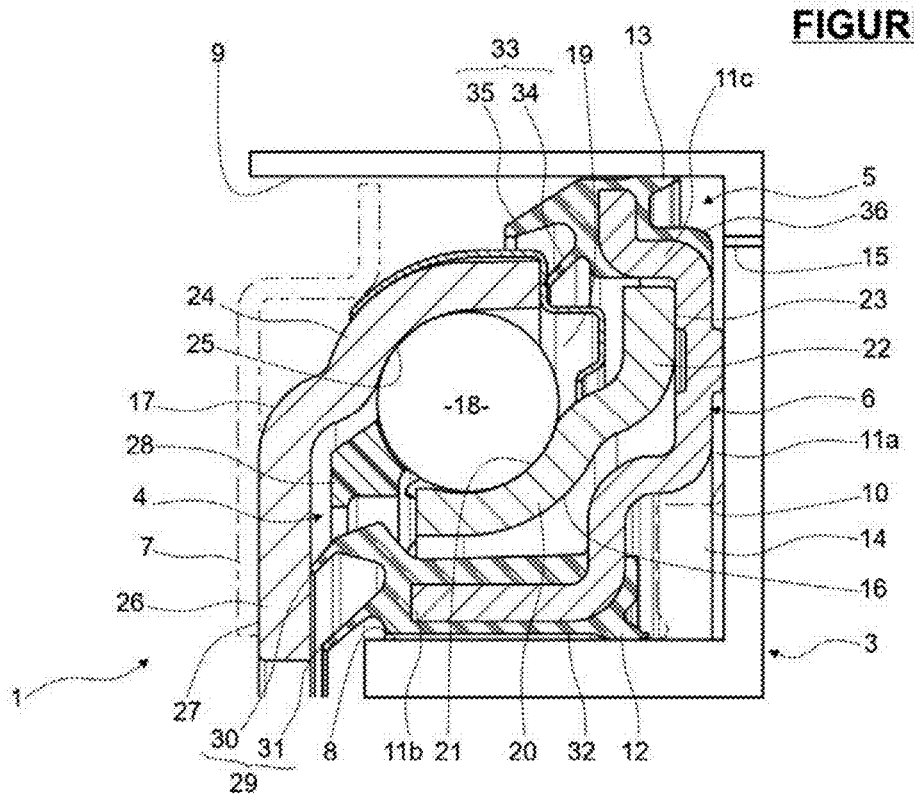
FIG. 1 is an axial section of a clutch thrust bearing device comprising a ball bearing according to a first embodiment of the invention.

As illustrated in FIG. 1, a clutch thrust bearing device 1 is advantageously integrated in a driveline system of a motor vehicle, not represented. The clutch thrust bearing device 1 is essentially annular and centered on a central axis.

The clutch thrust bearing device 1 comprises a fixed housing 3, a rolling bearing, here a ball bearing 4, the fixed housing 3 and ball bearing 4 defining a cavity 5 wherein an axially movable piston 6 is arranged, and a resilient biasing member 7 shown by way of a dot-dashed line, for example a wavy spring.

The housing 3 is fixed, and advantageously is a part of a rear drive module provided to the driveline system. The housing comprises the annular cavity 5 centered on the central axis. The cavity 5 is defined between two lateral walls 8, 9, and a bottom surface 10, the cavity 5 being axially open to the ball bearing 4.

The piston 6 is annular, is centered on the central axis, and is arranged within the cavity 5 of housing 3. The piston 6 comprises a substantially radial plate 11a extending radially between the two lateral walls 8, 9 of cavity 5. The piston 6 is provided with an inner axial portion 11b that axially extends from inner periphery of radial plate 11a towards the ball bearing 4, and an outer axial portion 11c that axially extends from outer periphery of radial plate 11a towards the ball bearing 4.

Advantageously, the piston 6 further comprises inner sealing means 12 made of resilient material and provided to inner bore of radial plate 11a, the sealing means being provided with a sealing lip in sliding contact with the lateral wall 8 of cavity 5. The piston also comprises outer sealing means 13 made of resilient material and provided to outer side of radial plate 11a, the sealing means being provided with a sealing lip in sliding contact with the lateral wall 9 of cavity 5. Advantageously, inner sealing means 12 is attached to the inner axial portion 11b, and outer sealing means 13 is attached to outer axial portion 11c. Advantageously, sealing means 12, 13 are made of polymer or synthetic material. Advantageously, sealing means 12, 13 are overmoulded onto axial portions 11b, 11c, respectively.

The piston 6, the lateral walls 8 and 9 and the bottom surface 10 define a sealed cavity 14. At least one channel 15 is provided through the housing 3 to connect the sealed cavity 14 with a source of hydraulic fluid (not represented) which may variably provide pressurized fluid in the sealed cavity 14 to axially move the piston 6. The lateral walls 8, 9 of cavity 5 permits the lateral guidance of piston 6.

In the present embodiment, the substantially radial plate 11a of piston 6 has a shape adapted to the ball bearing 4. Alternatively, the substantially radial plate 11a may have any other suitable shape.

The ball bearing 4 is annular and centered on the central axis. The ball bearing 4 is at least partly arranged in the cavity 5 of housing 3, the piston 6 being axially interposed between the bottom surface 10 of the cavity 5 and the ball bearing 4.

The ball bearing 4 comprises a fixed inner ring 16, a rotatable outer ring 17, and one series of balls 18 located in a raceway chamber 19 defined between the rings 16, 17. Alternatively, the bearing 4 may comprise any other suitable type of rolling elements, such as rollers or needles.

The fixed inner ring 16 comprises a toroidal portion 20 of outside toroidal surface 21 forming an inner raceway for the balls 18, and a radial portion 22 that outwardly radially extends from the toroidal portion 20. The radial portion 22 has an axial contact surface 23 bearing against the radial plate 11a of axially movable piston 6. The ball bearing 4 is set in axial movement by the transmission of the movement of piston 6 to the axial contact surface 23 of fixed inner ring 16.

The rotatable outer ring 17 comprises a toroidal portion 24 of inner toroidal surface 25 forming an outer raceway for the balls 18.

Advantageously, the rotatable outer ring 17 further comprises a radial portion 26 that outwardly radially extends from an inner side of the toroidal portion 24. The radial portion 26 has an axial contact surface 27 in axial abutment against the resilient biasing member 7.

As an alternate not shown, the rotatable ring cooperating with the resilient biasing member 7 may be an inner ring, and the fixed ring cooperating with the axially movable piston 6 may be an outer ring.

Advantageously, the ball bearing 4 further comprises an annular cage 28 comprising a plurality of pockets that receive each a ball 18. Balls 18 are then circumferentially equally spaced and held.

According to the invention, the inner axial portion 11*b* on inner periphery of radial plate 11*a* is further provided with an inner bearing sealing element 29.

The inner bearing sealing element 29 comprise a first sealing lip 30 that essentially axially extends from the axial portion 11*b* towards the radial portion 26 of outer rotatable ring 17. The first sealing lip 30 comes in sliding contact with the lower surface opposite to axial contact surface 27.

The inner sealing element 29 further comprises a second sealing lip 31 that essentially axially extends from the axial portion 11*b* towards the radial portion 26 of outer rotatable ring 17. The second sealing lip 31 comes in close vicinity of lower surface opposite to axial contact surface 27 to define an axial gap. Second sealing lip 31 and radial portion 26 of outer rotatable ring 17 form a labyrinth seal. The second sealing lip 31 is arranged at a lower diameter than that of the first sealing lip 30, the second sealing lip 31 forming a first barrier to prevent the entry of pollution and more particularly large sized particles, the first sealing lip 30 forming a second barrier against particles of lower size. Inner bearing sealing element 29 prevents the entry of pollution from inner side of device 1 into the raceway chamber between the rings 17, 18 and into the space defined between the fixed inner ring and the radial plate 11*a* of piston 6.

Advantageously, the inner bearing sealing element 29 is made of resilient material, for example in polymer or synthetic material. Advantageously, the inner bearing sealing element 29 is overmoulded onto the inner axial portion 11*b* extending from radial plate 11*a* of axially movable piston 6.

Advantageously, the inner bearing sealing element 29 comprises a sealing gasket 32, the inner axial portion 11*b* being embedded within the sealing gasket.

Advantageously, the inner sealing means 12, the sealing gasket 32, and the bearing inner sealing element 29 are formed integral.

According to a further aspect of the illustrated embodiment, the outer axial portion 11*c* on inner periphery of radial plate 11*a* is further provided with an outer bearing sealing element 33.

The outer bearing sealing element 33 comprise a first sealing lip 34 that essentially axially extends from the axial portion 11*c* towards the outer rotatable ring 17. The first sealing lip 34 comes in sliding contact with the edge of toroidal portion 24.

The outer sealing element 33 further comprises a second sealing lip 35 that essentially axially extends from the axial portion 11*c* towards the outer rotatable ring 17. The second sealing lip 35 comes in close vicinity of toroidal portion 24 to define a radial gap. Second sealing lip 35 and toroidal portion 24 of outer rotatable ring 17 form a labyrinth seal. The second sealing lip 35 is arranged at a higher diameter than that of the first sealing lip 34, the second sealing lip 35 forming a first barrier to prevent the entry of pollution and more particularly large sized particles, the first sealing lip 34 forming a second barrier against particles of lower size. Outer bearing sealing element 33 prevents the entry of pollution from outer side of device 1 into the raceway chamber between the rings 17, 18 and into the space defined between the fixed inner ring and the radial plate 11*a* of piston 6.

Advantageously, the outer bearing sealing element 33 is made of resilient material, for example in polymer or synthetic material. Advantageously, the inner bearing sealing element 33 is overmoulded onto the outer axial portion 11*c* extending from radial plate 11*a* of axially movable piston 6.

Advantageously, the outer bearing sealing element 33 comprises a sealing gasket 36, the inner axial portion 11*b* being embedded within the sealing gasket.

Advantageously, the outer sealing means 13, the sealing gasket 36, and the bearing inner sealing element 33 are formed integral.

As an alternate not shown, the axially movable piston is provided with only bearing sealing element. Alternatively, the inner sealing element 29 only comprises a sliding lip 30.

Figure 2:
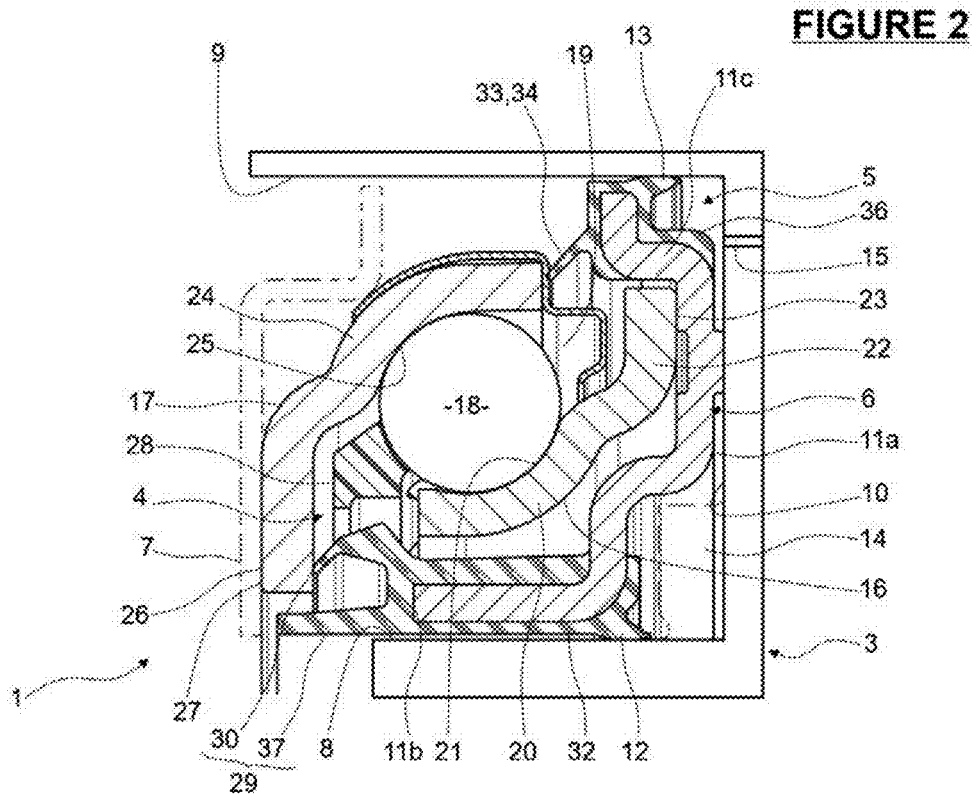
FIG. 2 is an axial section of a clutch thrust bearing device comprising a ball bearing according to a second embodiment of the invention.

According to an alternate embodiment illustrated in FIG. 2, the outer sealing element 33 may comprise only a sliding lip 34.

The inner sealing element 29 comprises a first sealing lip 30 that essentially axially extends from the axial portion 11*b* towards the radial portion 26 of outer rotatable ring 17. The first sealing lip 30 comes in sliding contact with the lower surface opposite to axial contact surface 27.

Furthermore, the inner sealing element 29 according to this second embodiment of the invention, comprises an annular flange 37 that extends axially from sealing gasket 32 towards the outer rotatable ring 17. The free end of the flange 37 is arranged in a bore defined by the radial portion 26. Flange 37 comes in close vicinity of free edge of radial portion 26 to define a radial gap. Flange 37 and radial portion 26 of outer rotatable ring 17 form a labyrinth seal.

Figure 3:
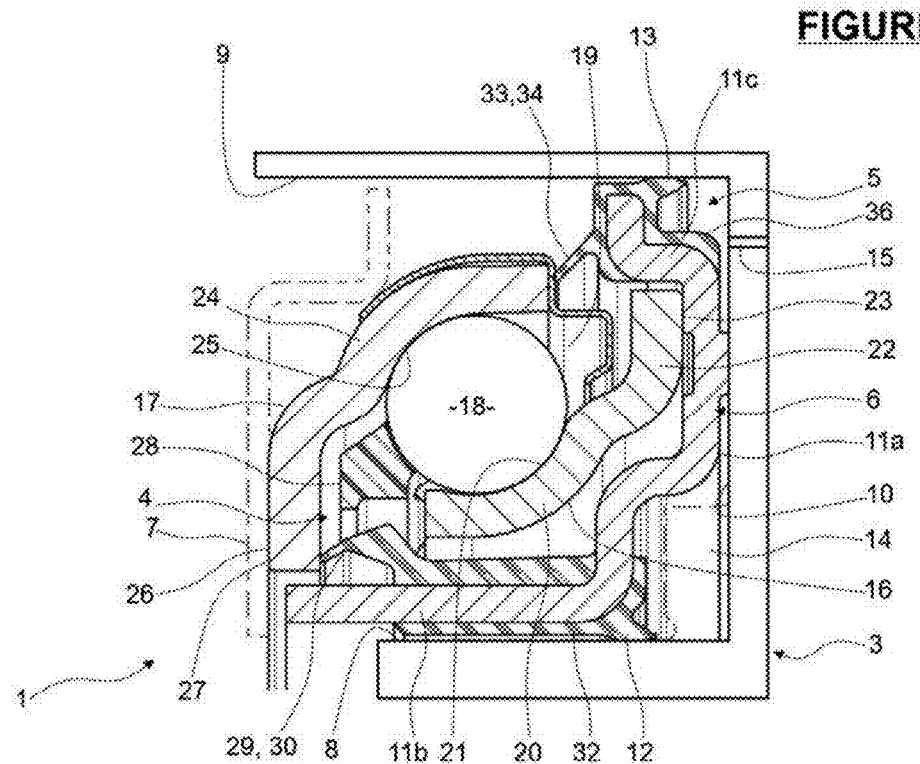
FIG. 3 is an axial section of a clutch thrust bearing device comprising a ball bearing according to a third embodiment of the invention.

According to an alternate embodiment illustrated in FIG. 3, the inner sealing element 29 comprises a first sealing lip 30 in sliding contact with the lower surface opposite to axial contact surface 27. Furthermore, the inner axial portion 11*b* extends axially from towards the outer rotatable ring 17, the free end of the portion 11*b* being arranged in a bore defined by the radial portion 26. Inner radial portion 11*b* comes in close vicinity of free edge of radial portion 26 to define a radial gap. Inner radial portion 11*b* and radial portion 26 of outer rotatable ring 17 form a labyrinth seal.

Figure 4:
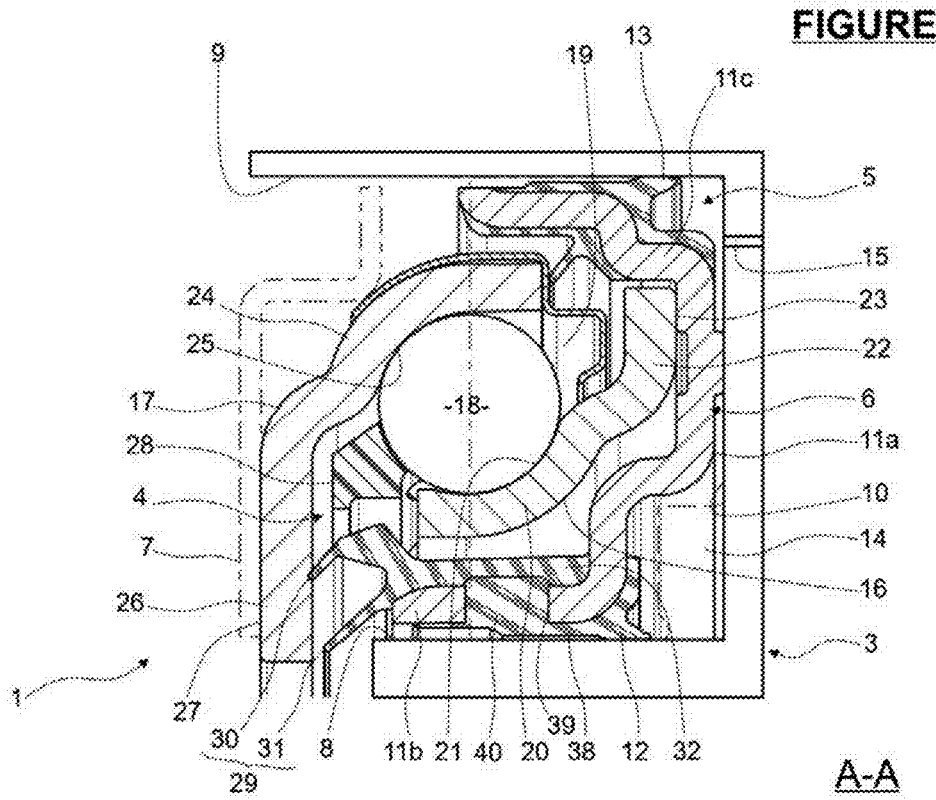
FIG. 4 is an axial section of a clutch thrust bearing device comprising a ball bearing according to a fourth embodiment of the invention.
Figure 5:
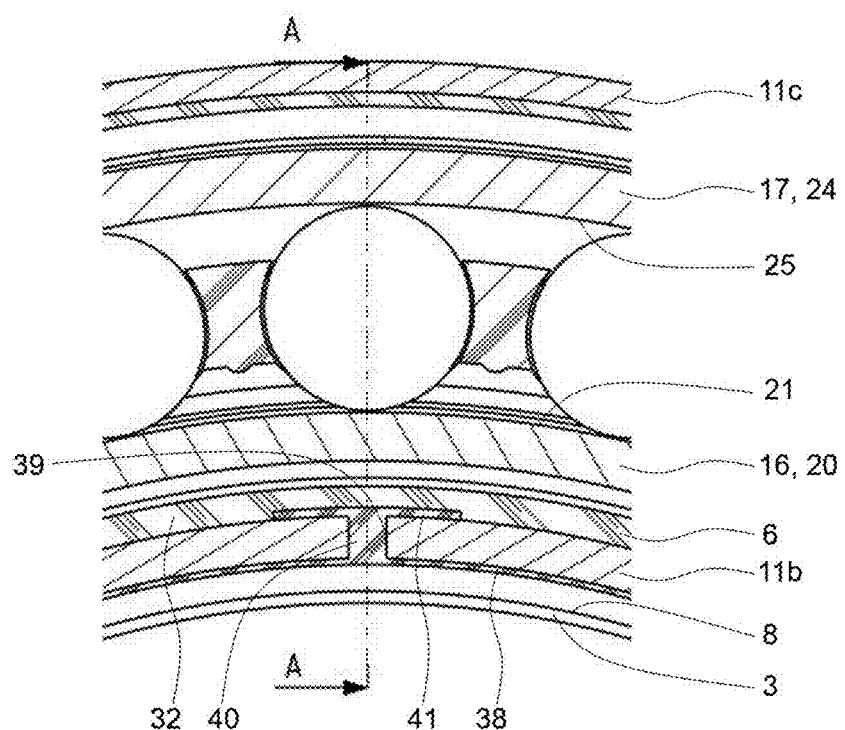
FIG. 5 is a radial section of the device of FIG. 4.

A fourth embodiment of the invention is illustrated in FIGS. 4 and 5.

The inner sealing element 29 comprises a first sealing lip 30 in sliding contact with the lower surface opposite to axial contact surface 27, and a second sealing lip 31 forming a labyrinth seal with the radial portion 26 of outer rotatable ring 17. Lips 30, 31 axially extends from a sealing gasket 32 covering an outer surface of inner axial portion 11*b* of piston 6.

According to this embodiment, the inner sealing means 12 comprises a sealing lip in sliding contact with the wall 8 of cavity 5, the lip extending from a gasket 38 covering an inner surface of inner axial portion 11*b* of piston 6.

The inner axial portion 11*c* is further provided with at least one through hole 39 extending radially between the inner and outer surfaces. The gasket 38 comprises a pin 40 extending in the through hole 39. Free end of the pin 40 is provided with an axial collar 41 to prevent any relative displacement between gasket 38 and axial portion 11*b*. Sealing gasket 32 covers the pin 40 and collar 41.

Advantageously, gasket 38 with pin 40, collar 41 and inner sealing means 12 with lip are first overmoulded onto the inner surface of inner axial portion 11*b*. Gasket 32 with inner sealing element 29 are then overmoulded onto the outer surface of inner axial portion 11*b* during a second step.

Representative, non-limiting examples of the present invention were described above in details with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved ball bearing.

Moreover, various features of the above-described representative examples, as well as the various independent and dependant claims below, may be combined in ways that are not specifically and explicitly enumerated in order to provide additional useful embodiments of the present teachings.

The invention claimed is:

1. A clutch thrust bearing device comprising:
a rolling bearing having a fixed ring and a rotatable ring, the fixed ring having an axial contact surface,
a plurality of rolling elements located in a raceway chamber defined between the fixed ring and the rotatable ring;
an axially movable piston configured to be disposed between a housing and the rolling bearing, the axially movable piston bears axially against the axial contact surface of the fixed ring, the axially movable piston comprising a radial plate with an inner periphery and an outer periphery thereof, the axially movable piston having a housing sealing means made of resilient material that is configured to define a sealed piston cavity with the housing, the piston cavity being connected to a source of hydraulic fluid configured to provide pressurized fluid in the cavity to axially move the axially moveable piston; and
a resilient biasing member exerting an axial preload onto an axial contact surface of the rotatable ring, the rolling bearing being adapted to move along an axial direction with the axially movable piston, the axial movement of the rolling bearing compressing the resilient biasing member; wherein
at least one of the inner periphery and the outer periphery of the radial plate of the axially movable piston is provided with a bearing sealing element of resilient material having at least one sealing lip in sliding contact with the rotatable ring of rolling bearing.

2. The clutch bearing device according to claim 1, wherein the housing sealing means and the bearing sealing element are integrally formed.

3. The clutch bearing device according to claim 1, wherein the bearing sealing element comprises at least one additional lip.

4. The clutch bearing device according to claim 3, wherein the at least one additional lip covers the sealing lip and defines a gap with the rotatable ring to form a labyrinth seal lip.

5. The clutch bearing device according to claim 1, wherein the axially movable piston comprises at least one axial portion that axially extends from the inner and/or outer periphery of the radial plate towards the rotatable ring.

6. The clutch bearing device according to claim 5, wherein the housing sealing means are attached to the at least one axial portion of the axially movable piston.

7. The clutch bearing device according to claim 5, wherein the bearing sealing element is attached to the at least one axial portion of the axially movable piston.

8. The clutch bearing device according to claim 5, wherein at least one axial portion that extends from the radial plate covers the sealing lip and defines a gap with the rotatable ring to form a labyrinth seal.

9. A driveline system of a motor vehicle comprising at least one clutch thrust bearing device according to the clutch thrust bearing device of claim 1 for selectively connecting or disconnecting at least one wheel from the driveline system.

10. The driveline system according to claim 9, comprising a front drive system including a front drive axle and front wheels, and a rear drive system including a rear drive axle, a rear drive module and rear wheels, the rear drive module being provided in series with a plurality of the clutch thrust bearing devices, each clutch thrust bearing device being able to selectively connect or disconnect one of the rear wheels.

* * * * *